United States Patent
Toft et al.

(10) Patent No.: US 8,871,318 B2
(45) Date of Patent: Oct. 28, 2014

(54) ROBUST PACKAGING LAMINATE, METHOD FOR MANUFACTURING OF THE PACKAGING LAMINATE AND PACKAGING CONTAINER PRODUCED THEREFROM

(75) Inventors: Nils Toft, Lund (SE); Åke Persson, Furulund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 336 days.

(21) Appl. No.: 13/381,521

(22) PCT Filed: Jul. 6, 2010

(86) PCT No.: PCT/EP2010/004068
§ 371 (c)(1),
(2), (4) Date: Dec. 29, 2011

(87) PCT Pub. No.: WO2011/003567
PCT Pub. Date: Jan. 13, 2011

(65) Prior Publication Data
US 2012/0103856 A1  May 3, 2012

(30) Foreign Application Priority Data
Jul. 8, 2009  (SE) ...................................... 0900947

(51) Int. Cl.
*B32B 27/10* (2006.01)
*B65D 73/00* (2006.01)
*B32B 37/15* (2006.01)
*B32B 3/26* (2006.01)
*B65D 75/26* (2006.01)

(52) U.S. Cl.
CPC .............. *B32B 27/10* (2013.01); *B65D 75/26* (2013.01); *B32B 37/153* (2013.01); *B32B 3/266* (2013.01)
USPC ................ 428/34.2; 156/244.11; 206/484.2; 428/35.9; 428/511

(58) Field of Classification Search
CPC ........ B32B 27/10; B32B 15/08; B32B 3/266; B32B 37/153; B65D 75/26
USPC ................ 156/244.11, 244.18, 307.5, 324; 206/524.2, 524.3, 484.2; 229/123.2, 229/125.14, 125.15; 427/372.2; 428/34.1–34.7, 35.6, 35.7, 35.9, 36.9, 428/511, 512
See application file for complete search history.

(56) References Cited

U.S. PATENT DOCUMENTS 4,590,126 A * 5/1986 Andersson ..................... 428/349
4,981,739 A * 1/1991 Gibbons et al. ............... 428/34.2
(Continued)

FOREIGN PATENT DOCUMENTS

| CN | 1462714 A | 12/2003 |
|----|-----------|---------|
| EP | 0 686 567 A2 | 12/1995 |

(Continued)

OTHER PUBLICATIONS

International—Type Search Report issued by Swedish Patent Office on Dec. 17, 2009 in Swedish Application No. 0900947-3. (5 pages).

(Continued)

*Primary Examiner* — Luan K Bui
(74) *Attorney, Agent, or Firm* — Buchanan, Ingersoll & Rooney PC

(57) ABSTRACT

A packaging laminate comprising a core layer of paper or carton with through-going holes, openings or slits, a first layer of heat sealable thermoplastic material applied on the outermost side of the packaging laminate, a second layer of heat sealable thermoplastic material applied on the other, innermost side of the packaging laminate, one or more barrier layers applied between the core layer and the innermost thermoplastic layer, the thermoplastic material and barrier layers all being laminated to each other within the regions of said holes to form a membrane of barrier and thermoplastic material layers. A method for manufacturing of the packaging laminate and a packaging container that is made from the packaging laminate.

18 Claims, 8 Drawing Sheets

(56) References Cited

U.S. PATENT DOCUMENTS

Figure 1A:
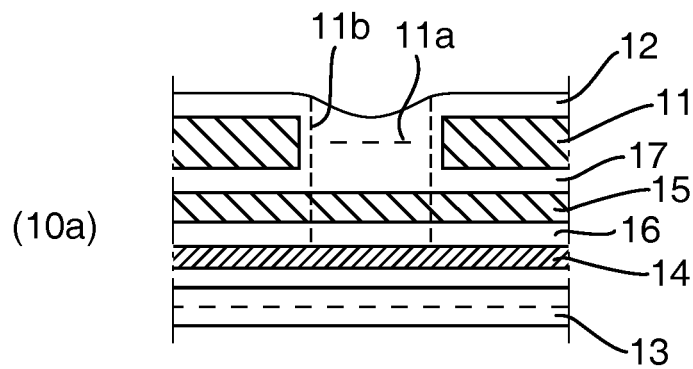

| | | | |
|---|---|---|---|
| 5,160,767 A * | 11/1992 | Genske et al. | 428/35.9 |
| 6,375,067 B1 * | 4/2002 | Moriyama | 229/125.09 |
| 6,402,019 B1 * | 6/2002 | Casale | 229/123.2 |
| 6,821,373 B1 * | 11/2004 | Berlin et al. | 156/244.11 |
| 6,884,206 B2 * | 4/2005 | Lasson et al. | 493/210 |
| 6,974,612 B1 * | 12/2005 | Frisk et al. | 428/34.2 |
| 7,033,455 B1 | 4/2006 | Berlin et al. | |
| 2001/0005550 A1 * | 6/2001 | Bengtsson et al. | 428/341 |
| 2005/0175800 A1 * | 8/2005 | Staffetti et al. | 428/34.2 |
| 2005/0181154 A1 * | 8/2005 | Toft et al. | 428/34.2 |
| 2009/0205994 A1 | 8/2009 | Sase et al. | |

FOREIGN PATENT DOCUMENTS

| | | |
|---|---|---|
| JP | H0639940 A | 2/1994 |
| JP | H06226851 A | 8/1994 |
| JP | 2000153855 A | 6/2000 |
| JP | 2002530224 A | 9/2002 |
| JP | 2003532567 A | 11/2003 |
| JP | 2005-263274 A | 9/2005 |
| JP | 2006-256293 A | 9/2006 |
| JP | 2008162598 A | 7/2008 |
| WO | 0030846 A1 | 6/2000 |
| WO | 0185565 A1 | 11/2001 |
| WO | WO 01/85565 A1 | 11/2001 |
| WO | WO 03/095199 A1 | 11/2003 |
| WO | WO 03/095200 A1 | 11/2003 |

OTHER PUBLICATIONS

International Search Report (PCT/ISA/210) issued on Feb. 23, 2011, by European Patent Office as the International Searching Authority for International Application No. PCT/EP2010/004068.

Chinese Office Action dated Dec. 2, 2013, issued in corresponding Chinese Application No. 201080030914.2 and English Translation of the Chinese Office Action. (20 pgs).

* cited by examiner

ROBUST PACKAGING LAMINATE, METHOD FOR MANUFACTURING OF THE PACKAGING LAMINATE AND PACKAGING CONTAINER PRODUCED THEREFROM

TECHNICAL FIELD

The present invention relates to a packaging laminate comprising a core layer of paper or carton with through-going holes, openings or slits, a first layer of heat sealable thermoplastic material applied on the outermost side of the packaging laminate, a second layer of heat sealable thermoplastic material applied on the other, innermost side of the packaging laminate, one or more barrier layers applied between the core layer and the innermost thermoplastic layer, the thermoplastic material and barrier layers all extending throughout the laminate, including the regions of the through-going holes, openings or slits of the core layer, and all being laminated to each other within the regions of said holes to form a membrane of barrier and thermoplastic material layers. The invention also relates to a method for manufacturing of the packaging laminate and to a packaging container that is made from the packaging laminate.

BACKGROUND OF THE INVENTION

Packaging containers of the single use disposable type for liquid foods are often produced from a packaging laminate based on paperboard or carton. One such commonly occurring packaging container is marketed under the trademark Tetra Brik Aseptic® and is principally employed for aseptic packaging of liquid foods such as milk, fruit juices etc, sold for long term ambient storage. The packaging material in this known packaging container is typically a laminate comprising a bulk core layer of paper or paperboard and outer, liquid-tight layers of thermoplastics. In order to render the packaging container gas-tight, in particular oxygen gas-tight, for example for the purpose of aseptic packaging and packaging of milk or fruit juice, the laminate in these packaging containers normally comprises at least one additional layer, most commonly an aluminium foil, which moreover renders the packaging material thermosealable by inductive thermosealing which is a rapid and efficient sealing technique for obtaining mechanically strong, liquid- and gas-tight sealing joints or seams during the production of the containers.

On the inside of the laminate, i.e. the side intended to face the filled food contents of a container produced from the laminate, there is an innermost thermoplastic heat sealing layer, applied onto the aluminium foil, which innermost, inside layer may be composed of one or several part layers, comprising heat sealable adhesive polymers and/or polyolefins. Most commonly, the thermoplastic heat sealable polymer is a low density polyethylene, which normally has adequate properties for heat sealing and for the function of moisture and liquid barrier towards the filled contents of the package. Also on the outside of the core layer, there is an outermost heat sealable polymer layer.

By innermost or inside layer is meant a layer which is applied on the side of the packaging laminate facing towards the inside of a packaging container formed from the laminate, and which will be in contact with the filled contents of a filled packaging container.

The packaging containers are generally produced by means of modern, high-speed packaging machines of the type that form, fill and seal packages from a web or from prefabricated blanks of packaging material. Packaging containers may thus be produced by reforming a web of the laminated packaging material into a tube by both of the longitudinal edges of the web being united to each other in an overlap joint by welding together the inner- and outermost heat sealable thermoplastic polymer layers. The tube is filled with the intended liquid food product and is thereafter divided into individual packages by repeated transversal seals of the tube at a predetermined distance from each other below the level of the contents in the tube. The packages are separated from the tube by incisions along the transversal seals and are given the desired geometric configuration, normally parallelepipedic, by fold formation along prepared crease lines in the packaging material.

The main advantage of this continuous tube-forming, filling and sealing packaging method concept is that the web may be sterilised continuously just before tube-forming, thus providing for the possibility of an aseptic packaging method, i.e. a method wherein the liquid content to be filled as well as the packaging material itself are reduced from bacteria and the filled packaging container is produced under clean circumstances such that the filled package may be stored for a long time even at ambient temperature, without the risk of growth of micro-organisms in the filled product. Another important advantage of the Tetra Brik®-type packaging method is, as stated above, the possibility of continuous high-speed packaging, which has considerable impact on cost efficiency.

From the consumer's point of view, it is desirable that the packaging container be easy to handle and easy to open when it is time to empty the package of its contents, and in order to satisfy this need, the packaging container is often provided with some type of opening arrangement, with the aid of which it may readily be opened without the need to employ scissors or other implements.

A commonly occurring opening arrangement in such packaging containers includes a hole punched in the core layer of the package wall, the hole being covered on the inside and outside of the package wall, by the respective outermost and innermost layers of the packaging wall which are sealed to one another in the region of the opening contour of the through-going hole, thus forming a membrane of the layers not being paperboard. One example of a prior art opening arrangement has a separate pull-tab or opening strip which is applied over the hole and which is rupturably sealed to the outer layer of the outside of the package wall along a sealing joint around the entire opening contour of the hole and at the same time permanently sealed to the outer layer in the region inside the opening contour of the hole.

In more advanced opening arrangements, an opening device, usually of moulded plastics, having a pouring spout and a screw top for resealing, is applied onto the region of and around the hole, which opening device is designed to penetrate or remove the membrane within the hole region by a pushing-down or screwing-down movement or, alternatively, to remove the membrane by a screwing- and/or pulling-up movement of the opening device. In the latter kind of opening device, the inside of a screwable part of the opening device is adhered to the membrane of the hole, in such a way that when it is screwed upwards away from the packaging wall, the membrane is lifted along with the screwable part and torn away from the edges of the hole, leaving a practically clean-cut hole for pouring the filled contents out of the package.

Further examples of more advanced opening arrangement are those with a cutting function, i.e. having a protruding part, such as a sharp edge or a peak that is forced to cut through the material within the hole membrane when the opening cork is screwed to open.

A precondition for any such an opening arrangement to function efficiently and expediently is that, there is adequate adhesion between the different layers of the membrane such that it does not delaminate when screwing- and pulling-down/pushing-up forces or cutting forces are applied to it during the opening operation.

It is generally difficult to obtain such adequate adhesion within the regions of the holes, because of the difference in total laminate thickness between the regions of the holes and the regions outside of the holes when laminating together the aluminium foil and thermoplastic layers of the membrane. When passing a web of the laminated layers through a press nip in a lamination station, the layers are pressed to adhere to each other by means of a pressure roller and a cooled cylinder. In the regions defined by the hole or the slit, the press nip is unable to press the layers together sufficiently for achieving the requisite adherence.

Thus, the thickness variations of the core layer may cause that the barrier layer, usually an aluminium foil, which is relatively thin, will not be pressed against and adhered sufficiently well to the surrounding layers of thermoplastics within the whole of the region defined by the hole, which means that air may be entrapped adjacent to the edges of the holes. Also, because the materials of the layers within the membrane laminate are not stable to heat load in the lamination steps, i.e. the layers are not sufficiently thermomechanically stable to keep their dimensions when heated up, there will be ruptures, cracks and other damages in the layers of the membrane.

This means that there may be fracture formations or cracks in the barrier layer, which may lead to the gas-tightness of the packaging container being impaired. Consequently, the colour, taste and nutritional values of the packaged food product may be deteriorated. Furthermore, the integrity of the package may be impaired.

The air inclusions also result in it being difficult to tear off or penetrate the membrane consisting of the barrier layer and the polymeric films in the hole or slit, with the ability to open the packaging being restricted and/or with it not being possible to make a clean cut when penetrating, resulting in the formation of frayed edges.

All these problems become more accentuated as the speed of the conversion from raw materials into a laminated packaging material web, is increased.

DISCLOSURE OF THE INVENTION

It is, therefore, an object of the present invention to overcome or alleviate the above-described problems.

One object of the invention is to provide a robust packaging laminate having a core layer with punched holes, openings or slits, with good adhesion and integrity between the laminate layers also within the regions of the holes of the core layer. With good integrity is meant that the material is substantially intact without cracks and damages, such that it is tight against liquids and gases that may otherwise migrate through the laminated material.

A further object of the invention is to provide a cost-effective, robust packaging laminate having a core layer with punched holes, openings or slits, with good adhesion and integrity between the laminate layers also within the regions of the holes of the core layer. The cost-efficiency may then primarily be obtained by the possibility to reduce the grammage of the material layers in the packaging laminate. However, cost-efficiency increases also by the possibility of increasing the conversion speed by which the packaging laminate is produced, and because there will be less wasted material from the more stable and robust packaging material production process.

These objects are attained according to the present invention by the packaging laminate comprising a core layer of paper or carton with through-going holes, openings or slits, a first layer of heat sealable thermoplastic material applied on the outermost side of the packaging laminate, a second layer of heat sealable thermoplastic material applied on the other, innermost side of the packaging laminate, one or more barrier layers applied between the core layer and the innermost thermoplastic layer, the thermoplastic material and barrier layers all extending throughout the laminate, including the regions of the through-going holes, openings or slits of the core layer, and all being laminated to each other within the regions of said holes to form a membrane of barrier and thermoplastic material layers, the packaging laminate further comprising a first additional stabilizing paper layer between the core layer and the second, innermost thermoplastic material layer, which additional paper layer also extends throughout the laminate such that a robust membrane is formed within the regions of the holes, the membrane also comprising said additional stabilizing paper.

A robust and thermomechanically stable hole membrane is also advantageous at the handling and conversion of the packaging laminate into filled packaging containers in the filling machine, wherein the laminate may be exposed to heat and mechanical stress.

In one important embodiment of the invention, the barrier layer(s) comprise an aluminium foil. The invention is thus an improvement in robustness of the foil-based liquid carton packaging laminate commonly used today. The membrane formed within the regions of the holes becomes much stronger, dimensionally stable, robust and reliable by including a paper layer also in the membrane. In cases where the openability may be affected by such a strong layer present in the membrane structure, the first, thin stabilising paper may be perforated or slitted within the hole regions in order to make it easier to tear or cut open, before, or after, the outermost heat sealable thermoplastic polymer layer is applied onto the laminate. Such perforation is then made by laser partial perforation cutting from the outside of the laminate down to the layer of the aluminium foil. Thus, the packaging laminate may be characterised by having a perforation cut within the regions of the holes in the paperboard, which perforation cuts through the first inner stabilising paper, but not the aluminium foil.

Alternatively, all the layers of the laminate may be laminated together to enable stable conversion operations and subsequently the outer thermoplastic layers and the layers down to the barrier layer, e.g. the aluminium foil, are cut away and removed in order to make the hole membrane very easy to open. In such cases, the outside of the packaging containers should be covered by a patch of a liquid tight material in order to prevent that any moisture or dirt is reaching the bare edge of the holes, cut in the paperboard.

In an alternative embodiment the barrier layer(s) comprise non-foil material, which is applied or coated onto the additional stabilising paper layer. Such non-foil barrier materials may comprise for example polymers or polymer compositions having barrier properties, which may be applied by any suitable method, but preferably by liquid film coating comprising an aqueous dispersion or solution of the polymer, but also other gas barrier coatings.

According to a further embodiment, an aluminium foil barrier may be combined with a non-foil barrier coated onto the first stabilising paper layer, e.g. a thin coating of PVOH.

On the inside of the first stabilizing paper layer, between the paper layer and the innermost heat sealable layer(s), there may be provided further barrier layers as needed.

According to one embodiment, the stabilising paper layer is part of a paper sandwich structure, comprising a softer paper core layer and a second, outer, additional stabilising paper layer on the outside of the core layer. By employing a sandwich construction of a middle spacer layer, which has relatively low stiffness in relation to its thickness, with a thin, flange, paper layer on each side, which has a relatively high stiffness in relation to its thickness (a higher Young's Modulus), a more cost-efficient and less resource-consuming packaging laminate may be produced. A considerably lower amount of paper may be used thanks to such a sandwich construction.

Moreover, the sandwich construction will allow a conversion model wherein the inside and outside laminates are pre-made separately, in parallel, and then laminated together, thus enabling greater opportunities for late ear-marking of material. This means that it will be easier to change the printed décor on the outside of the second, outer stabilising layer, or the barrier characteristics of the layers on the inside of the first stabilising layer, more quickly and thereby to better adapt the laminate production to the various customers' orders. A pre-made outside may thus be made from a printed board provided with punched/cut holes, before laminating it further to the bulk and inside layers.

Furthermore, the parallel conversion model is less severe on the core paper layer of the structure, by not exposing the paper bulk or core layer to so many high-pressure lamination nips, why there will be less decay in total stiffness of the packaging laminate to be produced. Consequently, the same stiffness may be kept by a lower amount of paper material.

According to one embodiment, the first, additional stabilizing paper layer has a surface weight of from 20 to 100 g/m2, preferably from 20 to 70 g/m2, more preferably from 30 to 50 g/m2. The optional second additional stabilising paper also suitably has a surface weight of from 20 to 100 g/m2, preferably from 20 to 70 g/m2, more preferably from 30 to 50 g/m2.

In packaging laminates having a sandwich construction from two, three or more paper layers, the stiffness and other properties of the first stabilizing layer should be balanced against the corresponding properties of the core layer or bulk layer and, if applicable, the outer stabilising paper layer.

According to another aspect of the invention, there is provided a cost-efficient packaging container manufactured from the packaging laminate of the invention, having good strength and integrity also in the regions of the opening holes.

According to a further aspect of the invention, there is provided a method of manufacturing of the packaging laminate, as specified in independent claim 10, comprising the steps of providing a web of a core layer of paper or carton with holes, openings or slits, coating or laminating by melt extrusion, a first outermost layer of heat sealable thermoplastic material on the outer side of the packaging laminate, the outermost layer thereby also covering the holes, providing a web of an additional stabilising paper layer on the inside of the core layer, providing at least one barrier layer on the inside of the core layer, providing a second innermost layer of heat sealable thermoplastic material on the innermost side of the packaging laminate, laminating said additional stabilising paper layer, said at least one barrier layer and said innermost layer of heat sealable thermoplastic material to each other and to the core layer such that all laminated layers on the inside of the core layer extend throughout the laminated web and are adhesively laminated to each other as well as to the first outermost layer of heat sealable thermoplastic material, within the regions of the holes in the core layer, whereby the layers on the inside of the core layer, together with the outermost heat sealable thermoplastic material layer, form a robust and laminated membrane, with reduced permeability to gas and liquid, within the regions of the holes or slits.

According to one embodiment of the method, the step of laminating the layers on the inside of the core layer comprises the part-steps of laminating the additional stabilising paper layer to a layer of thermoplastic heat sealable adhesive material, laminating the thus obtained thermoplastic-coated paper layer to any further inside layers in such a way that a pre-manufactured inside part-laminate is formed, and laminating the other, inner side of the core layer to the outer side of the additional stabilising paper layer of the pre-manufacture inside part-laminate by applying an intermediate layer of a thermoplastic material, in such a way that the thermoplastic material layers on each side of the core layer are sealed to each other within the regions of the holes. According to one embodiment the barrier layer may then be aluminium foil, which is laminated to the thermoplastic-coated side of the stabilising paper layer by heat-pressure lamination, using the heat from simultaneous extrusion coating or extrusion laminating of the innermost thermoplastic material heat sealable layer onto the other side of the aluminium foil.

According to another embodiment, the barrier layer is coated onto the first additional stabilising paper layer in a pre-coating step, which barrier-coated paper layer is subsequently laminated into the pre-laminated inside or to the core layer.

According to a different embodiment of the invention, the first stabilising paper layer forms part of a paper sandwich structure, comprising an intermediate core layer of a soft paper layer and a second, additional, stabilising paper layer on the outer side of the core layer, the method comprising a further, initial step of laminating the second, additional paper layer web to the soft core layer web and subsequently providing the thus obtained pre-laminated paper web with through-going holes, openings or slits, before any step of further laminating to the inside layers of the laminate.

The problems of adhesion between the layers within the membrane and the air entrapments between the layers, have hitherto been reduced to an acceptable level, by means of a press roller comprising a metal core with a circular-cylindrical jacket surface, which jacket surface is faced with an inner facing layer consisting of an elastic material, having a first hardness and a first thickness, and arranged on the outside of the inner facing layer, an outer facing layer consisting of an elastic material, having a second hardness and a second thickness, with the first hardness is greater than the second hardness and with the first thickness being greater than the second thickness.

Due to the outer facing layer of lower hardness, a desired penetration is achieved in the hole regions in the core layer, when the core layer, the aluminium foil and the polymeric layers pass through the press nip, at the same time as the low thickness of the outer, softer facing layer results in the press nip length not being appreciably extended, meaning that a desired pressure can be maintained in the press nip while still retaining a high line load.

However, when raising the conversion line speed, the use of such an adapted lamination press roller may not suffice to keep the acceptable level of defects and damages around the laminated hole regions in the packaging laminate.

BRIEF DESCRIPTION OF THE ACCOMPANYING DRAWINGS

Figure 1B:
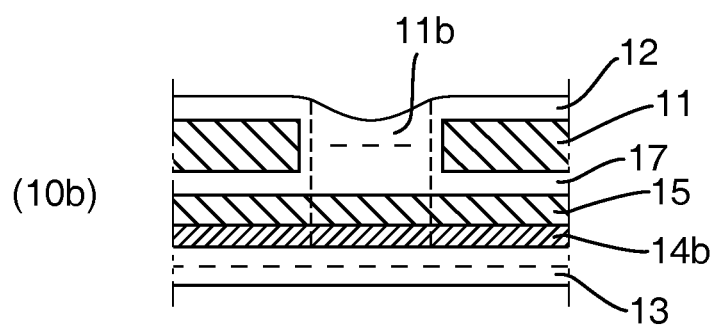
Figure 1C:
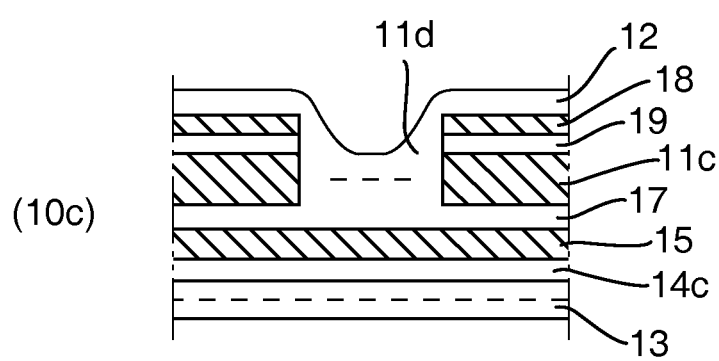
Figures 1, 2A:
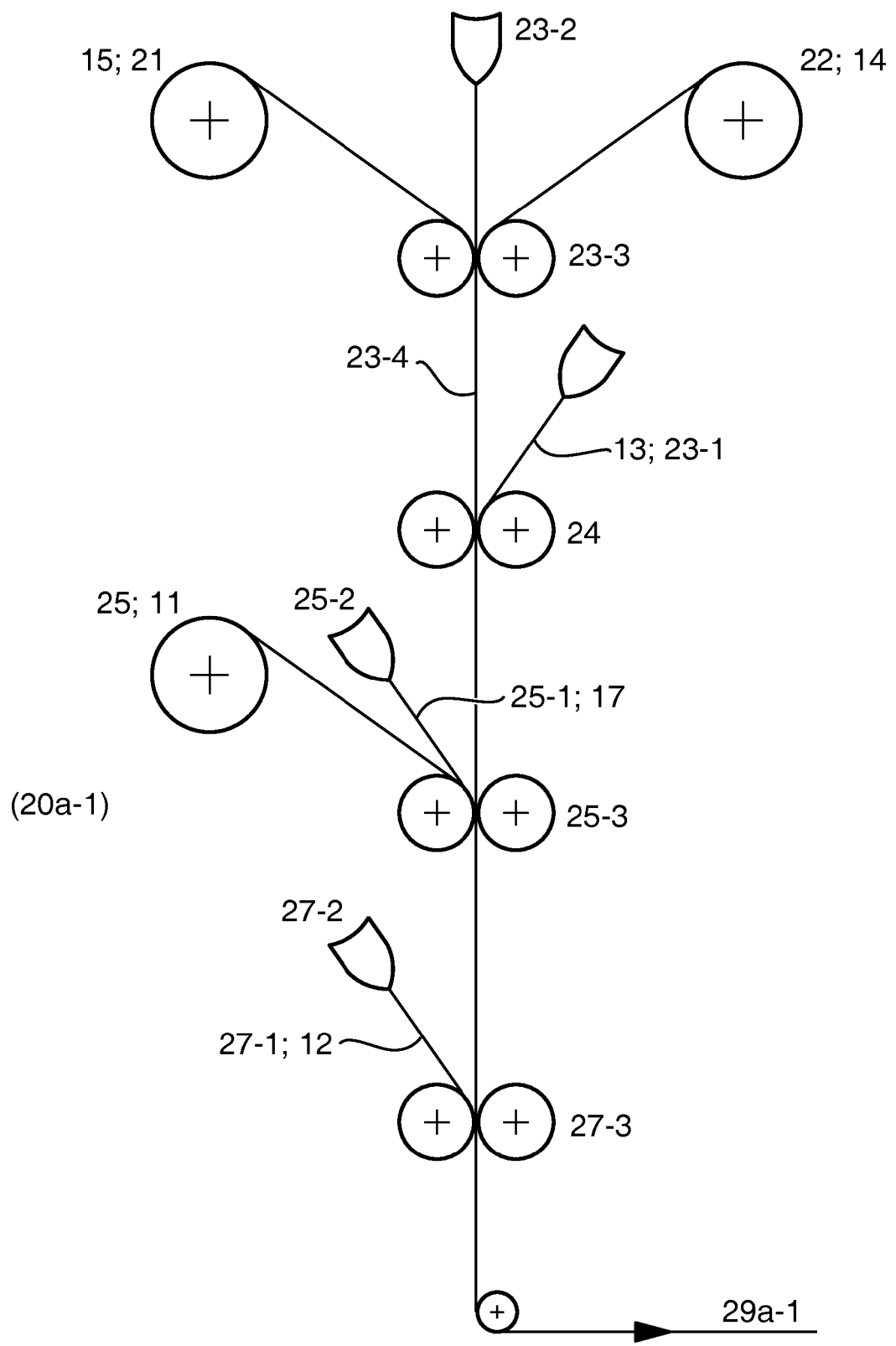
Figures 2, 2A:
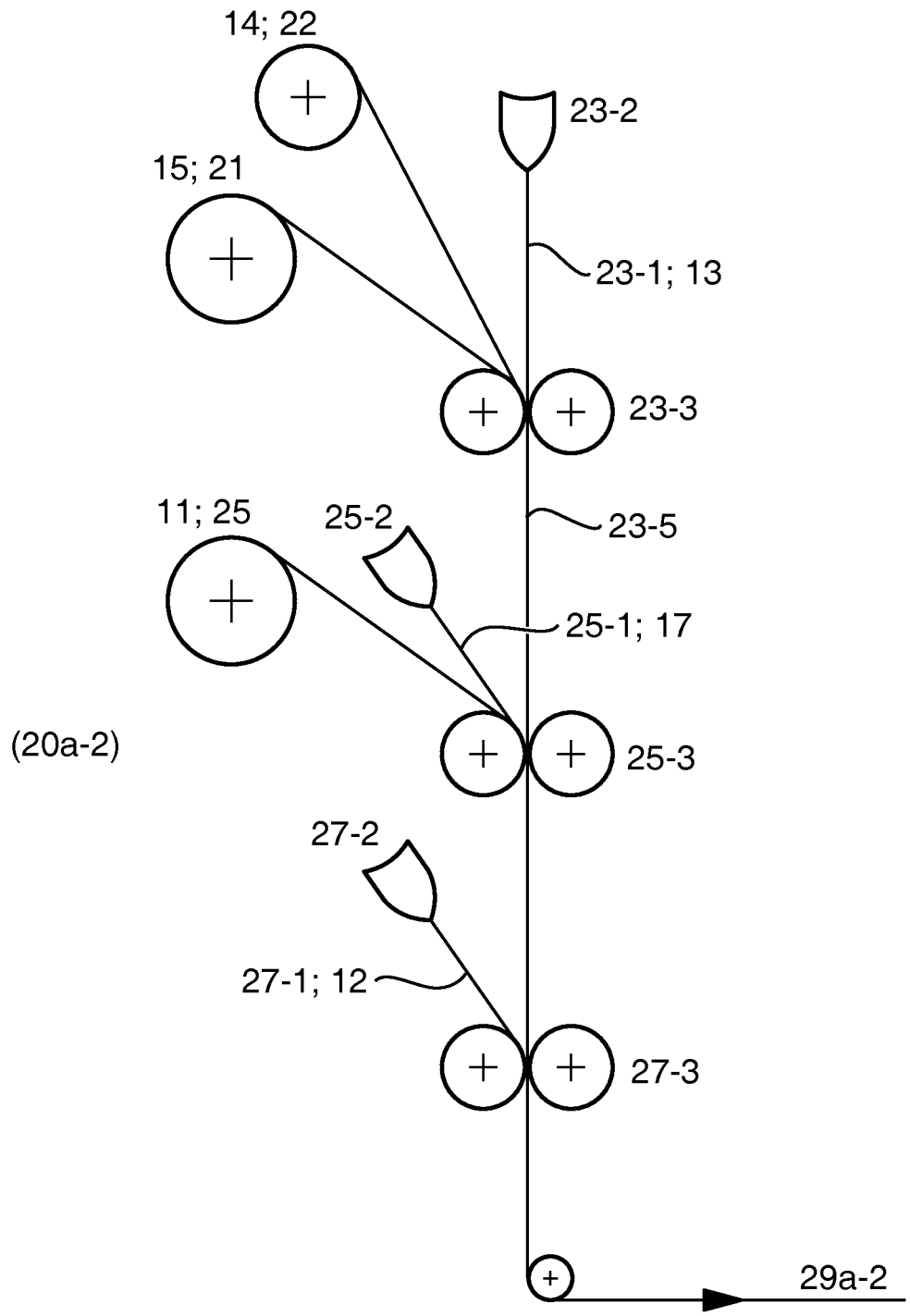
Figures 1, 2B:
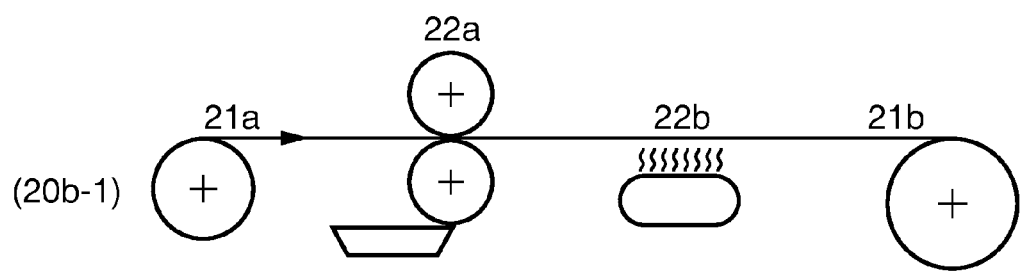
Figures 2, 2B:
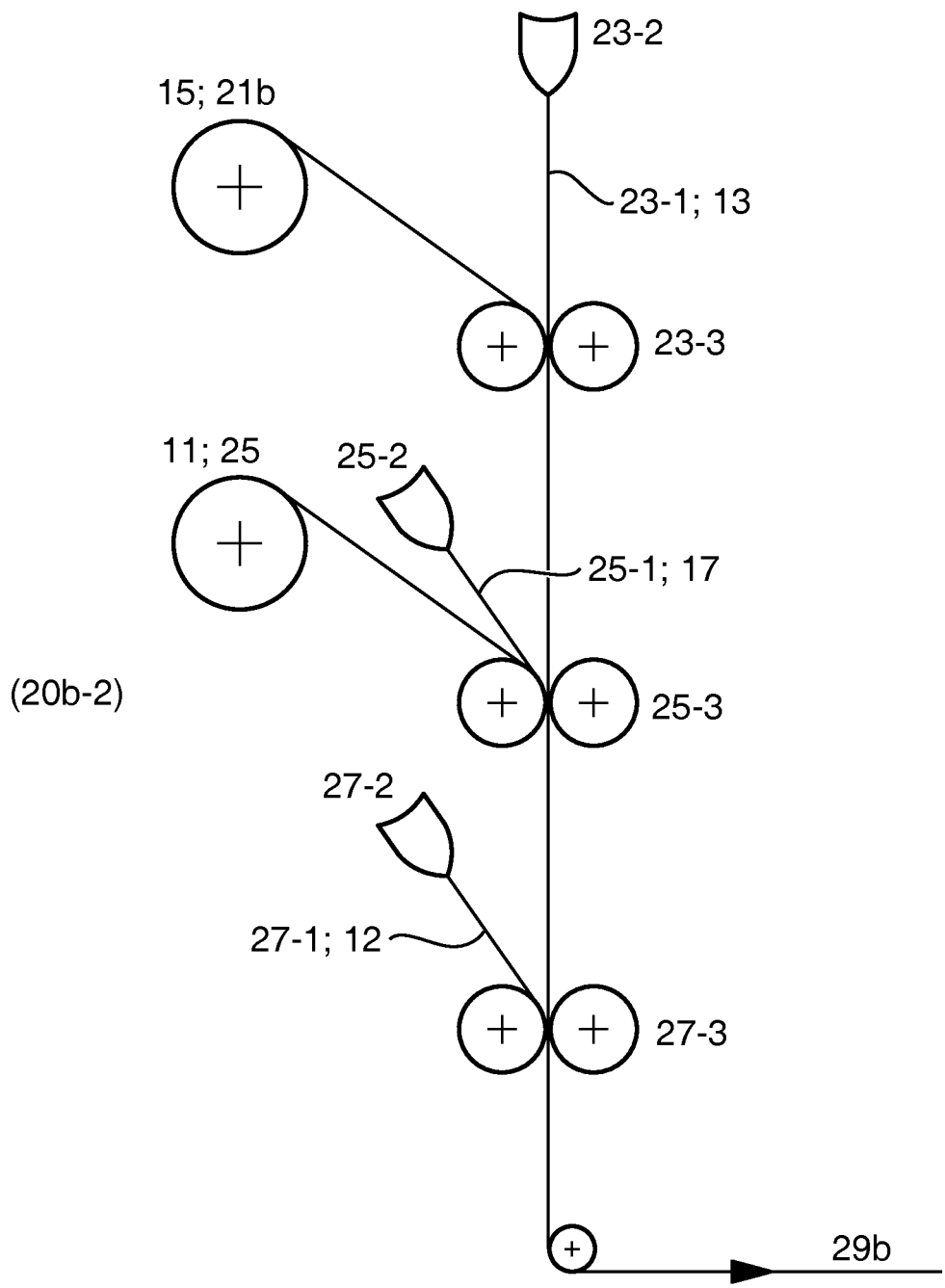
Figure 2C:
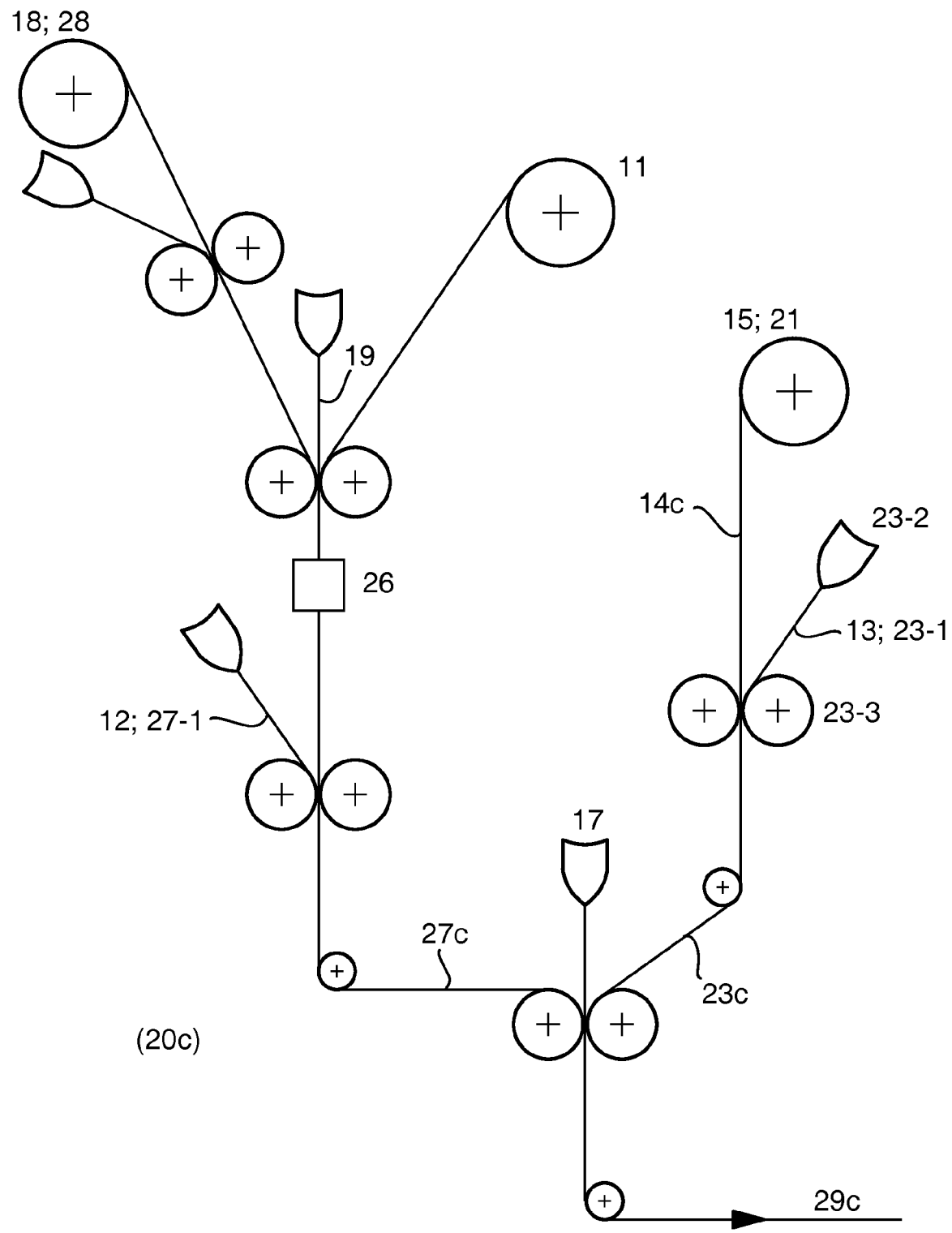
Figure 3:
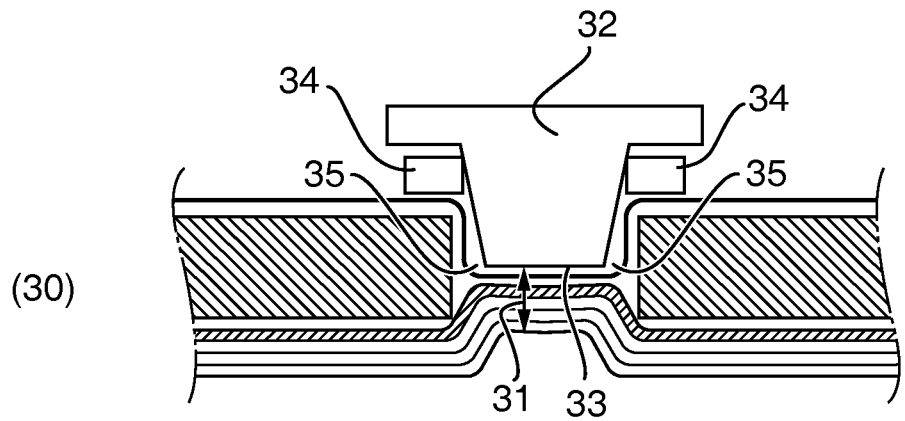
Figure 4:
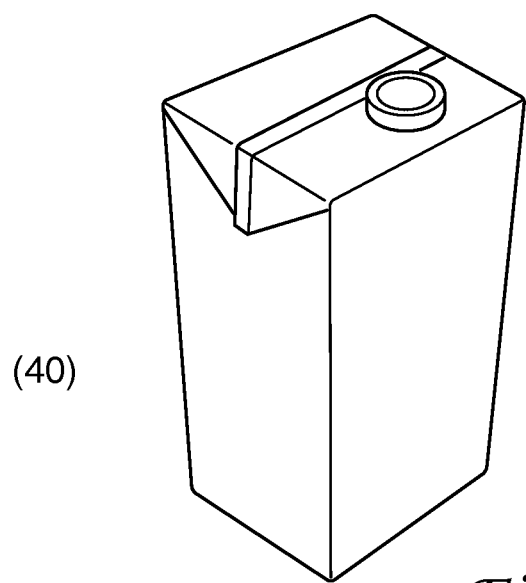
Figure 5:
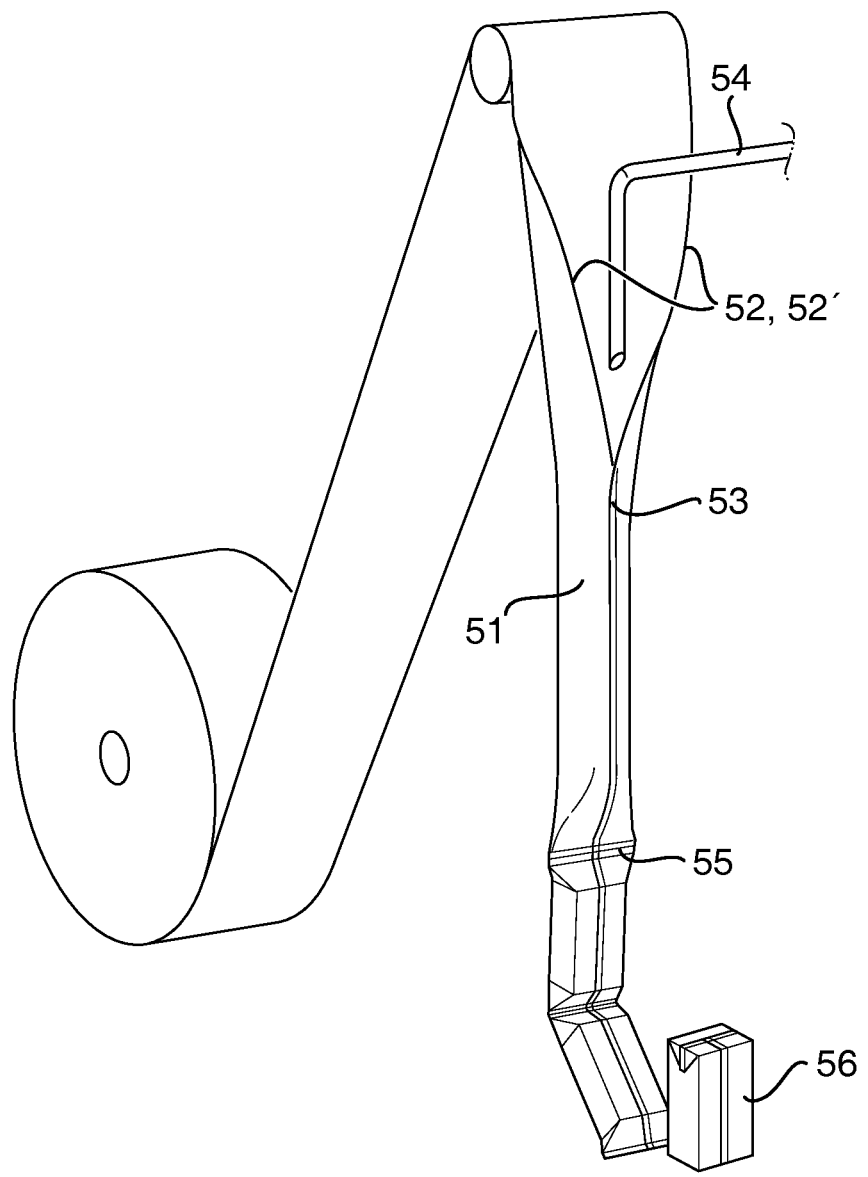

Further advantages and favourable characterizing features of the present invention will be apparent from the following detailed description, with reference to the appended figures, in which:

FIGS. 1a, 1b and 1c show cross-sectional views of laminated packaging materials;

FIGS. 2a-1 and 2a-2 schematically illustrate embodiments of a method of manufacturing of the laminated packaging material described in conjunction with FIG. 1a, FIGS. 2b-1 and 2b-2 illustrate together an embodiment of a method of manufacturing of the packaging laminate shown in FIG. 1b, FIG. 2c illustrates one embodiment of a method of manufacturing the packaging laminate in FIG. 1c;

FIG. 3 schematically illustrates one embodiment of an opening arrangement for which the packaging laminate of the invention is suited;

FIG. 4 is a side elevation in perspective of a configurationally stable and durable packaging container, equipped with an opening arrangement as exemplified in FIG. 3, which packaging container is produced from a laminated packaging material according to the present invention; and FIG. 5 is showing the principle of how such packaging containers are manufactured from the packaging laminate in a continuous form, fill and seal process.

DETAILED DESCRIPTION

Referring to FIG. 1a, the packaging laminate of the invention 10a includes a core layer 11, which is a configurationally rigid but foldable paperboard or carton. The core layer is provided with going-through holes, opening or slits 11a for the purpose of applying opening arrangements on the packages manufactured from the packaging laminate. On one side, being the outer side of a package produced from the laminate, i.e. the side facing outwards away from the filled food product, of the core layer 11, a first, outer layer of heat sealable thermoplastics 12 is applied, which also provides a liquid and moisture barrier to that side of the core layer. The outer thermoplastic layer is preferably applied in a quantity of about 10-20, preferably 12-18 g/m$^2$, and is in particular a polyethylene, such as a low density polyethylene (LDPE).

The core layer 11 is laminated on its inner side, facing towards the inside of a package produced from the laminate, to an additional stabilizing paper layer 15. The stabilizing paper 15 is first laminated to a gas barrier layer of an aluminium foil 14 by means of an intermediary bonding layer of thermoplastics 16, preferably a low density polyethylene, such as LDPE. The intermediate bonding layer 16 may be applied in a quantity of from about 2 to about 30, g/m$^2$, depending on which lamination technology is used. In extrusion lamination, a lamination layer thickness of about 10-25 g/m2, preferably from 10-15 g/m2, may be used.

On the inner side of the aluminium foil, i.e. the side not bonded to the core layer, a thermoplastic structure 13 of two or three part-layers of heat sealable thermoplastics is applied. A first part-layer comprising an adhesive polymer is arranged to contact the aluminium foil and provide sufficient adhesion between the aluminium foil and the innermost layers of heat sealable low density polyethylene(s). Preferably, the innermost part-layer comprises in the majority an ethylene-alpha-olefin, polymerised in the presence of a single site, metal-locene, catalyst (m-PE), and is applied next to the adhesive layer or alternatively to a second intermediate part-layer of LDPE.

The adhesive polymer is preferably a copolymer of ethylene and acrylic acid or methacrylic acid. The third innermost part-layer preferably consists of a blend of about 60-70 weight-% of m-PE and about 30-40 weight-% of LDPE.

The most preferred quantities of the respective thermoplastic part-layers may be about 5-7 g/m$^2$ of the first part-layer, about 15-18 g/m$^2$ of the second part-layer and about 10 g/m$^2$ of the third part-layer. The inner structure of thermoplastic part-layers may thus be applied in a total quantity of about 30-35 g/m$^2$.

The layers 13, 14, 15 and 16 may be laminated to each other to form a pre-made inside laminate, which is further laminated to the inner side of the paper board core layer 11, having the through-going holes, openings or slits, by means of an intermediary bonding layer 17 or thermoplastic polymer or a dry lamination adhesive.

All of the layers 13, 14, 15, 16, 17 and 12 are extending throughout the laminate and thus covering also the regions of the holes, on each side of the core layer.

In order to further improve the openability of the thus created membrane of layers within the region of the hole, the layers in the membrane outside of the aluminium foil, including the thin stabilizing paper layer, may be laser perforated or slitted 11b around the edge of the hole, down to, but not through, the aluminium foil.

Referring to FIG. 1b, the packaging laminate 10b includes a core layer 11, which is a configurationally rigid but foldable paperboard or carton. The core layer is provided with going-through holes, opening or slits 11b for the purpose of applying opening arrangements on the packages manufactured from the packaging laminate. On one side, being the outer side of a package produced from the laminate, i.e. the side facing outwards away from the filled food product, of the core layer 11, a first, outer layer of heat sealable thermoplastics 12 is applied, which also provides a liquid and moisture barrier to that side of the core layer. The outer thermoplastic layer is preferably applied in a quantity of about 10-20, preferably 12-18 g/m$^2$, and is in particular a polyethylene, such as a low density polyethylene (LDPE).

The core layer 11 is laminated on its inner side, facing towards the inside of a package produced from the laminate, to an additional stabilizing paper layer 15. The stabilizing paper 15 is first coated with a gas barrier layer 14b, by means of any suitable coating method, and then laminated to the core layer 11 by means of an intermediary bonding layer of thermoplastics 17, preferably a low density polyethylene, such as LDPE.

On the inner side of the barrier-coated paper layer 15-14b, i.e. the side not bonded to the core layer, a thermoplastic structure 13 of one or more layers of heat sealable thermoplastics is applied. Preferably, the innermost layer 13 comprises in the majority an ethylene-alpha-olefin, polymerised in the presence of a single site, metallocene, catalyst (m-PE), and may be applied to the barrier-coated paper layer, optionally with an adhesive polymer layer between.

Such an adhesive polymer is preferably a copolymer of ethylene and acrylic acid or methacrylic acid. The innermost layer preferably consists of a blend of about 60-70 weight-% of m-PE and about 30-40 weight-% of LDPE.

The inner structure of thermoplastic layers may be applied in a total quantity of about 15-35 g/m$^2$.

The layers 13, 14b, and 15 may be laminated to each other to form a pre-made inside laminate, which is further laminated to the inner side of the paper board core layer 11, having the through-going holes, openings or slits 11b, by means of an intermediary bonding layer 17 or thermoplastic polymer or a dry lamination adhesive.

All of the layers 13, 14, 15, 17 and 12 are extending throughout the laminate and thus covering also the regions of the holes, on each side of the core layer.

FIG. 1c is showing a packaging laminate 10c, which includes a paper sandwich structure, comprising a soft and fluffy core or bulk layer 11c, which is laminated to a first stabilizing paper 15 on the inner side and to a second stabilizing paper 18 on its outer side. The second, outer stabilising paper layer and the core paper layer 11c may be laminated to each other in a first step to form a pre-sandwich of paper layers, by means of an intermediary bonding layer 19 of a thermoplastic polymer or a dry lamination adhesive. The opening holes 11d may subsequently be punched or cut through said pre-sandwich in the selected positions. The second, outer stabilizing paper layer is coated with an outermost, liquid tight and heat sealable thermoplastic polymer layer 12, preferably a low density polyethylene, e.g. LDPE.

The stabilizing paper 15 is first coated with a gas barrier layer 14c, by means of any suitable coating method, and then laminated to the core layer 11 by means of an intermediary bonding layer of thermoplastics 17, preferably a low density polyethylene, such as LDPE.

On the inner side of the barrier-coated paper layer 15-14c, i.e. the side not bonded to the core layer, a thermoplastic structure 13 of one or more layers of heat sealable thermoplastics is applied. Preferably, the innermost layer 13 comprises in the majority an ethylene-alpha-olefin, polymerised in the presence of a single site, metallocene, catalyst (m-PE), and may be applied to the barrier-coated paper layer, optionally with an adhesive polymer layer between.

Such an adhesive polymer is preferably a copolymer of ethylene and acrylic acid or methacrylic acid. The innermost layer preferably consists of a blend of about 60-70 weight-% of m-PE and about 30-40 weight-% of LDPE.

The inner structure of thermoplastic layers may be applied in a total quantity of about 15-35 g/m$^2$.

The layers 13, 14c, and 15 may thus be laminated to each other to form a pre-made inside laminate, which is further laminated to the inner side of the paper board core layer 11, having the through-going holes, openings or slits 11d, by means of an intermediary bonding layer 17 or thermoplastic polymer or a dry lamination adhesive.

All of the layers 13, 14, 15, 17 and 12 are extending throughout the laminate and thus covering also the regions of the holes, on each side of the core layer.

Generally, it is preferable that the innermost heat sealable layers are extrusion coated onto the inner side of the gas barrier layer. Alternatively, it is of course possible to apply a pre-manufactured thermoplastic polymer film as the innermost heat sealable layer. Pre-manufactured films, such as extrusion blown films or extrusion cast films often generally have higher mechanical strength than extrusion coated films. Often such films are manufactured from polymers having a higher molecular weight and generally obtain higher toughness. Where such properties are needed for particular purposes, e.g. for tougher handling and transport conditions, or when desiring to use lower amounts of polymer for cost-efficiency, the use of such pre-manufactured films may be advantageous. However, in general, in order to provide easy openability of the layered membrane of the hole, an extrusion coated innermost heat sealable polymer layer may be preferred.

Referring to FIG. 2a-1, in a method 20a-1 of manufacturing the packaging laminate 10a of the invention, a web of a first stabilizing paper layer 15; 21 is laminated to an aluminium foil 14; 22 by extrusion laminating 23-2 them to each other with an intermediate layer of a thermoplastic bonding polymer 23-1 in a first lamination step. The first stabilizing paper layer and the aluminium foil are pressed together in a roller nip 23-3, thus, becoming a laminate of paperboard and aluminium foil 23-4. Subsequently, in any order, three further lamination steps are carried out, i.e. a laminating step 24 wherein the innermost layer(s) 13;23-1 of heat sealable thermoplastic polymer(s) is applied, a laminating step wherein a paperboard core layer web 11; 25, which has been provided with holes or slits 11a, is led forward to a lamination nip 25-3 wherein the paper-side of a web of laminated stabilizing paper, aluminium foil and innermost layers, is laminated to the inner side of a core paperboard layer 11; 25 by extrusion laminating with an intermediate layer 17; 25-1 of thermoplastic polymer, such as for example LDPE, from an extruder 25-2. Finally, the resulting laminate is led forward to the next lamination step 27-2, 27-3, where an outermost layer 12; 27-1 of thermoplastic polymer, such as for example LDPE, is extrusion coated onto the outside of the core paperboard layer 11; 25. The thus finished packaging laminate 29a-1 is led forward and wound onto a storage reel, not shown.

In an alternative embodiment, the first stabilizing paper 21 may be first pre-coated with a thin layer of thermoplastic bonding polymer, preferably an adhesive polymer, on its inner side, such as for example ethylene acrylic acid (EAA), and then laminated to the aluminium foil 22 by means of heat and pressure in a hot roller nip. In this embodiment of the method, the extruder 23-2 may thus be omitted.

According to a preferred embodiment of the invention, the surface of the aluminium foil is activated by means of a surface treatment (not shown), before it is coated with the inside layers of thermoplastics 13, at 24.

Referring to FIG. 2a-2, in a method 20a-2 of manufacturing the packaging laminate 10a of the invention, a web of a first stabilizing paper layer 15; 21 is first pre-coated with a thin layer of thermoplastic bonding polymer, preferably an adhesive polymer, on its inner side, such as for example ethylene acrylic acid (EAA), and then laminated to the aluminium foil 14; 22 by means of heat and pressure, without any intermediate bonding, in a first lamination step 23-3, by means of the heat from the simultaneous (co-) extrusion coating 23-2 of one or more innermost heat sealable polymer layers 13; 23-1. The first stabilizing paper layer and the aluminium foil are pressed together in a roller nip 23-3, thus, becoming a laminate of paperboard and aluminium foil 23-5 and innermost heat seal layers 13. Subsequently, in any order, two further lamination steps are carried out, i.e. a laminating step wherein a paperboard core layer web 11; 25, which has been provided with holes or slits 11a, is led forward to a lamination nip 25-3 wherein the paper-side of a web of laminated stabilizing paper, aluminium foil and innermost layers, is laminated to the inner side of a core paperboard layer 11; 25 by extrusion laminating with an intermediate layer 17; 25-1 of thermoplastic polymer, such as for example LDPE, from an extruder 25-2. Finally, the resulting laminate is led forward to the next lamination step 27-2, 27-3, where an outermost layer 12; 27-1 of thermoplastic polymer, such as for example LDPE, is extrusion coated onto the outside of the core paperboard layer 12; 25. The thus finished packaging laminate 29a-2 is led forward and wound onto a storage reel, not shown.

Finally, the finished or almost finished packaging laminate may be led through a station for laser perforation or slitting (not shown) the membranes around the hole edges, in order to facilitate openability of various opening arrangements to be mounted on the outside of the package or packaging laminate onto the hole area. Thus, one or more of the membrane layers within the hole area may be laser perforated or slitted around the hole edge to facilitate the use of opening arrangements to cut or tear the membrane open.

Furthermore, a double-acting pressure roller may be used at all lamination stations 25, 27 and at the lamination of the outer layer on the outside of the core layer, in combination with a rather high nip pressure, in order to achieve optimal adhesion between the laminate layers of the membranes within the regions of the holes and avoiding air entrapments between the layers close to the edges around the holes.

According to a preferred embodiment of the invention, the surface of the aluminium foil is activated by means of a surface treatment (not shown), before it is coated with the inside layers of thermoplastics 13, at 23-3.

In FIG. 2b-1, the method of liquid film coating of a liquid oxygen barrier composition onto the first stabilising paper layer 15, 21 is grammatically shown. The paper layer 21a is fed from a storage reel towards a liquid film coating station 22a, where the liquid gas barrier composition is applied at an amount such that the amount of coated and dried layer is about 1-3 g/m2, when the coated paper has passed the drying station 22b. Preferably, the liquid film coating operation is carried out in two steps, i.e. by first coating 0.5-2 g/m2, drying in an intermediate step and then coating a second time at 0.5-2 g/m2 and finally drying the total liquid film coated layer to obtain an oxygen barrier coated paper layer 21b.

Referring to FIG. 2b-2, in a method 20b-2 of manufacturing the packaging laminate 10b of the invention, a web of a barrier-coated first stabilizing paper layer 15; 21b is laminated to one or more innermost heat sealable layers 13; 23-1, in a first lamination step 23-3, by means of (co-) extrusion coating 23-2. Subsequently, in any order, two further lamination steps are carried out, i.e. a laminating step wherein a paperboard core layer web 11; 25, which has been provided with holes or slits 11a, is led forward to a lamination nip 25-3 wherein the outer, uncoated, side of a web of the barrier-coated stabilizing paper and innermost layers, is laminated to the inner side of a core paperboard layer 11; 25 by extrusion laminating with an intermediate layer 17; 25-1 of thermoplastic polymer, such as for example LDPE, from an extruder 25-2. Finally, the resulting laminate is led forward to the next lamination step 27-2, 27-3, where an outermost layer 12; 27-1 of thermoplastic polymer, such as for example LDPE, is extrusion coated onto the outside of the core paperboard layer 12; 25. The thus finished packaging laminate 29b is led forward and wound onto a storage reel, (not shown).

Furthermore, generally in all method embodiments of the invention, a double-acting pressure roller may be used at all lamination stations 25, 27 and at the lamination of the outer layer on the outside of the core layer, in combination with a rather high nip pressure, in order to achieve optimal adhesion between the laminate layers of the membranes within the regions of the holes and avoiding air entrapments between the layers close to the edges around the holes.

FIG. 2c shows a parallel conversion method 20c of manufacturing the packaging laminate 10c of the invention, wherein on the one hand, the second, outer stabilizing paper layer 18; 28 is laminated to a core paper layer 11, which has a relatively low stiffness in relation to its thickness and therefore will act as a spacer layer between the outer stabilizing paper layer and the inside layers, by means of an intermediate bonding layer 19 of a polymer. In a subsequent step, opening holes are cut at predetermined positions on the thus laminated paper sandwich by mechanical punching or alternatively by laser cutting. Subsequently, an outermost layer 12; 27-1 of thermoplastic polymer, such as for example LDPE, is extrusion coated onto the outside of the second outer stabilizing layer 18; 28. On the other hand, a first stabilizing paper layer 15, is coated with an oxygen gas barrier coating 14c, by the method as shown in FIG. 2b-1, and subsequently coated by any further barrier layers and one or more innermost layers 13 on the inner, side of the coated paper. The two accordingly produced pre-laminates, i.e. pre-made outside 27c and pre-made inside 23c are finally extrusion laminated to each other by means of an intermediate bonding layer 17 of a thermoplastic polymer, e.g. LDPE. The thus finished packaging laminate 29c is led forward and wound onto a storage reel, (not shown).

Referring to FIG. 3, in an example of an intended opening arrangement 30, the laminated membrane 31, comprising the layers of the thin stabilizing paper layer, thermoplastics and aluminium foil, is sealed to a screw top 32, being part of an opening device applied to the packaging container, at an interface 33. When opening by screwing the screw top 32 upwards, by means of a thread arrangement with the surrounding parts of the opening device 34, the membrane is sheared along the edges around the hole 35 at the same time as it is pulled upwards together with the top.

Referring to FIG. 4, a typical aseptic package of the type Tetra Brik Aseptic® is provided with an opening arrangement as described in FIG. 3. The hole with the membrane is provided at the top of the packaging container and there is attached an opening device of moulded plastics onto the membrane over the hole, which opening device consists of a frame and a screw top threaded into it. The opening device may be further provided with a so called tampering evidence, the position of which indicates if the packaging container has been opened or not.

FIG. 5 shows the principle as described in the introduction of the present application, i.e. a web of packaging material is formed into a tube 51 by the longitudinal edges 52, 52' of the web being united to one another in an overlap joint 53. The tube is filled 54 with the intended liquid food product and is divided into individual packages by repeated transversal seals 65 of the tube at a pre-determined distance from one another below the level of the filled contents in the tube. The packages 56 are separated by incisions in the transversal seals and are given the desired geometric configuration by fold formation along prepared crease lines in the material.

By way of conclusion it should be observed that the present invention which has been described above with particular reference to the accompanying figures, is not restricted to these embodiments described and shown exclusively by way of example, and that modifications and alterations obvious to a person skilled in the art are possible without departing from the inventive concept as disclosed in the appended claims.

The invention claimed is:

1. Packaging laminate comprising a core layer of paper or carton with through-going holes, openings or slits, a first layer of heat sealable thermoplastic material applied on an outermost side of the packaging laminate and forming an outermost thermoplastic layer, a second layer of heat sealable thermoplastic material applied on an innermost side of the packaging laminate and forming an innermost thermoplastic layer, one or more gas barrier layers applied between the core layer and the innermost thermoplastic layer, the innermost and outermost thermoplastic and gas barrier layers all extending throughout the packaging laminate, including regions of the core layer at which are located the through-going holes, openings or slits, and all being laminated to each other within the regions of said through-going holes, openings or slits to form a membrane of the barrier and innermost and outermost thermoplastic layers, the packaging laminate further comprising a first additional stabilizing paper layer between the core layer and the gas barrier layers, the first additional stabilizing paper layer extending throughout the packaging laminate such that a robust membrane is formed within the regions of the through-going holes, openings or slits, the robust membrane also comprising said first additional stabilizing paper layer.

2. Packaging laminate according to claim 1, wherein said gas barrier layer comprises an aluminium foil.

3. Packaging laminate according to claim 1, wherein said gas barrier layer comprises non-aluminium-foil material, which is applied or coated onto the first additional stabilizing paper layer.

4. Packaging laminate according to claim 1, wherein the first additional stabilising paper layer is part of a paper sandwich structure, comprising a softer paper core layer and a second, outer, additional stabilizing paper layer on an outside of the core layer.

5. Packaging laminate according to claim 1, wherein the first additional stabilizing paper layer has a surface weight of from 20 to 100 g/m$^2$.

6. Packaging laminate according to claim 1, wherein the first additional stabilizing paper layer has a surface weight of from 20 to 70 g/m$^2$.

7. Packaging laminate according to claim 1, wherein the first additional stabilizing paper layer has a surface weight of from 30 to 50 g/m$^2$.

8. Packaging container manufactured from the packaging laminate as specified in claim 1.

9. Method of manufacturing a packaging laminate according to claim 1, comprising
providing a web of the core layer of paper or carton with the holes, openings or slits,
coating or laminating by melt extrusion, the first outermost layer of heat sealable thermoplastic material on the outer side of the packaging laminate, the first outermost layer thereby also covering the holes, openings or slits,
providing a web of the first additional stabilizing paper layer on the inside of the core layer,
providing at least one barrier layer on the inside of the core layer,
providing a second innermost layer of heat sealable thermoplastic material on the innermost side of the packaging laminate,
laminating said additional stabilizing paper layer, said at least one gas barrier layer and said innermost layer of heat sealable thermoplastic material to each other and to the core layer such that all laminated layers on the inside of the core layer extend throughout the laminated web and are adhesively laminated to each other as well as to the outermost layer of heat sealable thermoplastic material, within the regions of the core layer at which are located the holes, openings or slits, whereby the layers on the inside of the core layer, together with the outermost heat sealable thermoplastic material layer, form a robust and laminated membrane, with reduced permeability to gas and liquid, within the regions of the holes, openings or slits.

10. Method of manufacturing a packaging laminate according to claim 9, wherein the laminating of the layers on the inside of the core layer comprises:
laminating the additional stabilizing paper layer to a layer of thermoplastic heat sealable adhesive material to produce a thermoplastic-coated paper layer,
laminating the thus obtained thermoplastic-coated paper layer to any further inside layers in such a way that a pre-manufactured inside part-laminate is formed,
laminating the other, inner side of the core layer to the outer side of the additional stabilising paper layer of the pre-manufacture inside part-laminate by applying an intermediate layer of a thermoplastic material, in such a way that the thermoplastic material layers on each side of the core layer are sealed to each other within the regions of the holes, openings or slits.

11. Method of manufacturing a packaging laminate according to claim 10, wherein the gas barrier layer is aluminium foil, which is laminated to the thermoplastic-coated side of the stabilizing paper layer by heat-pressure lamination, using the heat from simultaneous extrusion coating or extrusion laminating of the innermost thermoplastic material heat sealable layer onto the other side of the aluminium foil.

12. Method of manufacturing a packaging laminate according to claim 9, wherein the barrier layer is coated onto the first additional stabilizing paper layer in a pre-coating step and the thus barrier-coated paper layer is subsequently laminated into the pre-laminated inside or to the core layer.

13. Method of manufacturing a packaging laminate according to claim 9, wherein the first stabilizing paper layer forms part of a paper sandwich structure, comprising an intermediate core layer of a soft paper layer and a second, additional, stabilizing paper layer on the outer side of the core layer, the method comprising a further, initial step of laminating the second, additional paper layer web to the soft core layer web and subsequently providing the thus obtained pre-laminated paper web with the through-going holes, openings or slits, before any step of further laminating to the inside layers of the laminate.

14. Method of manufacturing a packaging laminate according to claim 9, wherein the robust membrane within the holes, openings or slits are laser perforated or slitted around the holes, openings, or slits to facilitate the use of opening arrangements to cut or tear the robust membrane open.

15. A packaging laminate comprising:
a core layer of paper or carton possessing through-going holes, openings or slits,
a first layer of heat sealable thermoplastic material positioned on an outermost side of the packaging laminate and forming an outermost thermoplastic layer,
a second layer of heat sealable thermoplastic material positioned on an innermost side of the packaging laminate and forming an innermost thermoplastic layer,
one or more barrier layers positioned between the core layer and the innermost thermoplastic layer, the innermost and outermost thermoplastic and barrier layers extending throughout the packaging laminate, including regions of the core layer at which the through-going holes, openings or slits are located, and being laminated to each other within the regions of the through-going holes, openings or slits,
a stabilizing paper layer positioned between the core layer and the innermost thermoplastic layer and extending throughout the package laminate, and
wherein the outermost thermoplastic layer and the stabilizing paper layer include perforations or slits, the perforations or slits being aligned with the through-going holes, openings or slits.

16. The packaging laminate according to claim 15, wherein the one or more barrier layers are gas barrier layers.

17. The packaging laminate according to claim 15, wherein the one or more barrier layers are oxygen barrier layers.

18. The packaging laminate according to claim 15, wherein the one or more barrier layers do not include the perforations or slits.

\* \* \* \* \*